United States Patent [19]

Kasuga

[11] Patent Number: 4,968,874
[45] Date of Patent: Nov. 6, 1990

[54] OPTICAL PICKUP WITH ASTIGMATISM CORRECTING LENS

[75] Inventor: Ikuo Kasuga, Komagane, Japan

[73] Assignee: Kabushiki Kaisha Sankyo Seiki Seisakusho, Nagano, Japan

[21] Appl. No.: 357,340

[22] Filed: May 25, 1989

[30] Foreign Application Priority Data

May 31, 1988 [JP] Japan .................. 63-133230

[51] Int. Cl.$^5$ .................. G01J 1/20; G02B 13/18; G02B 27/10
[52] U.S. Cl. .................. 250/201.5; 350/171; 350/433; 350/434; 350/447; 369/44.23
[58] Field of Search .............. 350/171, 432, 433, 434, 350/447; 369/44, 45, 46, 110, 44.23; 250/201 DF, 201.5

[56] References Cited

U.S. PATENT DOCUMENTS

| | | | |
|---|---|---|---|
| 4,079,247 | 3/1978 | Bricot et al. | 250/201 DF |
| 4,412,723 | 11/1983 | Shafer | 350/171 |
| 4,561,080 | 12/1985 | Yamazaki | 250/201 DF |
| 4,614,863 | 9/1986 | Sato | 369/44 |
| 4,709,139 | 11/1987 | Nakamara et al. | 369/44 |
| 4,724,533 | 2/1988 | Ohara et al. | 369/44 |
| 4,731,527 | 3/1988 | Nomura et al. | 369/46 |
| 4,767,921 | 8/1988 | Kawasaki et al. | 250/201.5 |
| 4,812,638 | 3/1989 | Ogatu et al. | 369/44 |
| 4,891,799 | 1/1990 | Nakano | 250/201.5 |

Primary Examiner—Jon W. Henry
Attorney, Agent, or Firm—Flynn, Thiel, Boutell & Tanis

[57] ABSTRACT

An optical pickup using a parallel plane plate type beam splitter is disclosed, in which the astigmatism produced by the fact that the light beam passes through the beam splitter is compensated by means of a correcting lens having anisotropically curved surfaces.

9 Claims, 2 Drawing Sheets

FIG. 4
PRIOR ART
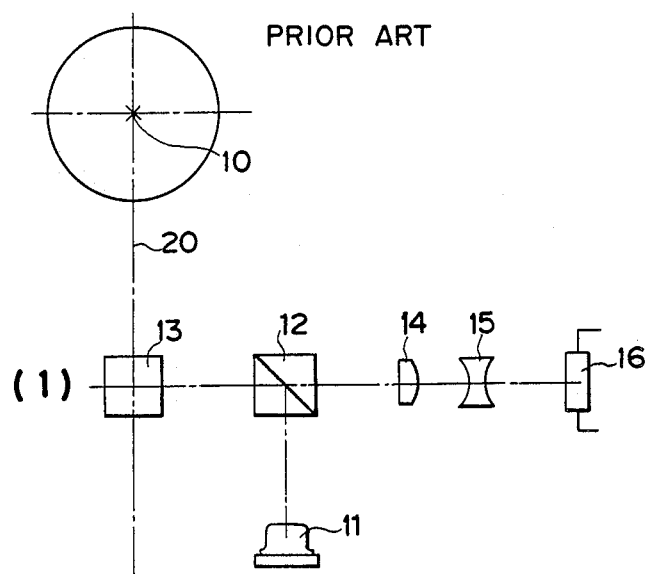
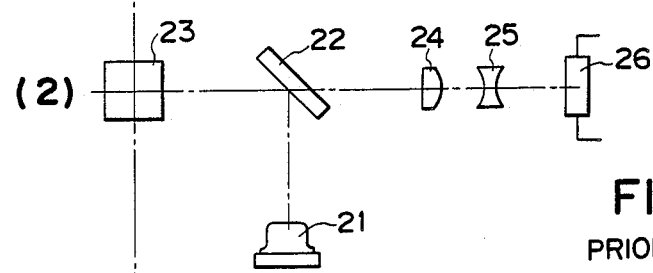
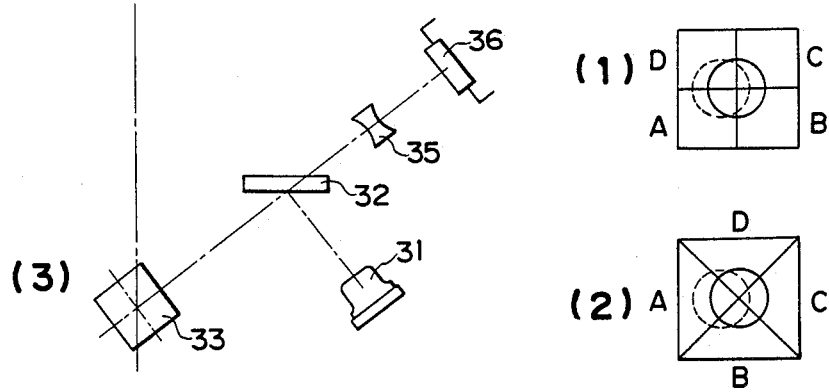
FIG. 5
PRIOR ART

OPTICAL PICKUP WITH ASTIGMATISM CORRECTING LENS

FIELD OF THE INVENTION

This invention relates to a optical pickup using a parallel plane plate type beam splitter.

BACKGROUND OF THE INVENTION

In an optical pickup used in an optical disk device, etc., in the case where an objective lens is moved in the tracking direction, a light spot is moved on the surface of a photosensitive element, which gives rise to off-set errors in the focusing error detection signal. In order to avoid it, various sorts of optical systems have been proposed. FIG. 4 shows various sorts of such prior art optical pickup optical systems In FIG. 4, reference numeral 10 indicates the center line, around which the optical disk is rotated, and 20 represents a line in the radial direction on the disk. In the optical system indicated in 4(1) a beam splitter 12 is used instead of a prism and astigmatism is produced by a cylindrical lens 14. Reference numeral 11 is a laser light source; 13 is a minor for bending a light beam coming from the beam splitter at a right angle to lead it to a recording track on the disk; 15 is a convex lens for increasing the magnification for the received light; and 16 is a photosensitive element. An objective lens is disposed between the mirror 13 and the disk.

The optical system indicated in FIG. 4(2) is an optical system, in which a half mirror 22 is used as the beam splitter and a new astigmatism is synthesized by means of a cylindrical lens 24. Reference numeral 21 is a laser light source; 23 is a mirror for bending a light beam coming from the beam splitter 22 at a right angle to lead it to a recording track on the disk; 25 is a convex lens for increasing the magnification for the received light; and 26 is a photosensitive element. An objective lens is disposed between the mirror 23 and the disk.

The optical system indicated in FIG. 4(3) is an optical system, in which a half mirror 32 is used as the beam splitter and the optical axis connecting 32 is used as the beam splitter and the optical axis connecting this beam splitter 32 with a photosensitive element 36 is inclined by several tens of degrees (e.g. 45) with respect to the objective lens drive direction for the tracking. The beam splitter 32 constitutes astigmatism generating means. Reference numeral 31 is a laser light source; 23 is a mirror for bending a light beam coming from the beam splitter 32 at a right angle to lead it to a recording track on the disk; 35 is a convex lens for increasing the magnification for the received light; and 36 is a photosensitive element. An objective lens is disposed between the mirror 33 and the disk.

In any one of the optical systems described above, in the case where the objective lens is moved in the tracking direction, when a light spot is moved not along two dividing lenses, which divide the photosensitive surface of the photosensitive element into four sections and are perpendicular to each other, as indicated by the broken line in FIG. 5(2), off-set errors are produced in the focusing detection signal. Therefore the astigmatism generating direction is rotated by several tens of degrees with respect to the objective lens drive direction for the tracking so that the light spot is moved along one of the driving lines on the four-divided photosensitive element, as indicated in FIG. 5(1), in order to reduce the off-set errors described above.

According to the optical system indicated in FIG. 4(1), it is necessary to use an expensive prism type beam splitter, which causes to raise the cost of the optical pickup. According to the optical system indicated in FIG. 4(2), since the astigmatism is produced by combining the beam splitter with the cylindrical lens, it is not possible to select freely the production direction and the magnitude of the astigmatism and therefore it has a problematical point that design freedom is low. According to the optical system indicated in FIG. 4(3), it is necessary to bend complicatedly the optical axis. Therefore it is difficult to secure the production precision, which is apt to cause lowing in the performance. Further, according to the optical systems indicated in FIGS. 4(2) and 4(3), since focusing errors are produced by the astigmatism of the beam splitter, in order to obtain predetermined focusing error detection characteristics, the magnitude of the astigmatism (range of astigmatism), i.e. thickness and material of the beam splitter are restricted. In addition, in any one of the optical systems, another member such as a convex lens is necessary for obtaining a predetermined value for the magnification on the light receiving side.

OBJECT OF THE INVENTION

This invention has been done for solving these problems of the prior art techniques and the object thereof is to provide a high performance optical pickup, in which off-set errors produced in a focusing error signal due to the movement of the spot on the surface of the photosensitive element accompanied by the movement of the objective lens in the tracking direction are eliminated by means of a cheap beam splitter optical system and in addition it is easy to obtain an arbitrary magnification of the received light as well as to effect adjustment by means of a simple optical system.

SUMMARY OF THE INVENTION

An optical pickup according to this invention, in which there is disposed a parallel plane plate type beam splitter between an object to be scanned and the photosensitive element, in characterized in that there is disposed a correcting lens having two anisotropically curved surfaces between the parallel plane plate type beam splitter and the photosensitive element described above and the anisotropically curved surfaces stated above are formed so as to compensate the astigmatism produced by the fact that the light beam passes through the beam splitter and at the same time to produce newly astigmatism having an arbitrary magnitude in another direction.

Astigmatism is produced by the fact that the light beam passes through the parallel plane plate beam splitter. This astigmatism is once eliminated by an anisotropically curved surface of the correcting lens and a new astigmatism is produced by the other anisotropically curved surface described above. Off-set of the focusing error detection signal can be prevented by inclining the direction of this new astigmatism by above 45° with respect to the objective lens drive direction for the tracking.

BRIEF DESCRIPTION OF THE DRAWINGS

FIG. 4 represents schemes illustrating the arrangement of the optical system in different examples of prior art optical pickups; and FIGS. 5(1) and 5(2) are front views showing examples of the movement of the light spot on the surface of the photosensitive element in the optical pickup.

DETAILED DESCRIPTION

Hereinbelow an embodiment of the optical pickup according to this invention will be explained referring to FIGS. 1 to 3(C).

Figure 1:
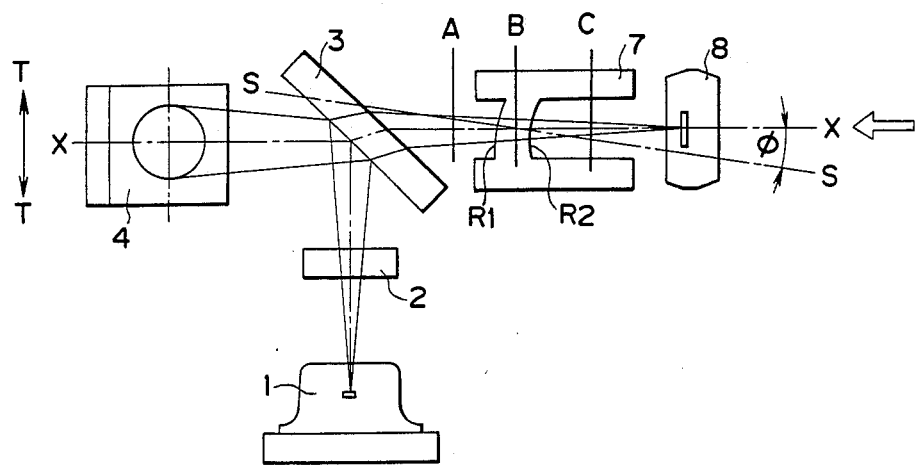
FIG. 1 is a scheme illustrating the arrangement of the optical system, which is an embodiment of the optical pickup according to this invention.
Figure 2:
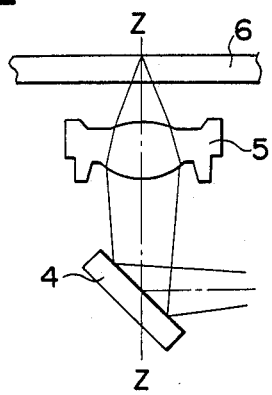
FIG. 2 is a scheme illustrating the arrangement of the optical system in the part including the objective lens used in the embodiment indicated in FIG. 1.

In FIGS. 1 and 2, a laser beam emitted by a laser light source 1 is divided by a diffraction grating 2 into 0-th order light beam and 1-st order light beam. A light beam transmitting by the diffraction grating 2 is reflected by a half mirror type beam splitter 3 and focused on an optical disk 6, which is an object to be scanned, by an objective lens 5 through a totally reflecting mirror 4 for bending the optical path. The light beam reflected by the optical disk 6 passes through the objective lens 5 and the mirror 4 in the reverse direction and arrives at a correcting lens 7 after having passed through the beam splitter 3. The light beam, which has passed through the correcting leans 7, arrives at a photosensitive element 8.

The axis X—X including the beam splitter 3 and the photosensitive element 8 is approximately perpendicular to the drive direction for the tracking T—T of the objective lens 5. The totally reflecting mirror 4 bends the optical axis X—X, which is parallel to the surface of the optical disk 6, at a right angle so as to form an optical axis Z—Z and in this way the height of the pickup is suppressed. Consequently, if there is no requirement to suppress the height of the pickup, the mirror 4 may be omitted so that the optical axes X—X and Z—Z are in accordance with each other.

It is possible also to dispose a collimator lens between the beam splitter 3 and the objective lens 5 and to use an objective lens of infinite magnification.

The correcting lens 7 stated above is made of glass or plastic material and has anisotropically curved surfaces R1 and R2 on the beam splitter 3 side and on the photosensitive element 8 side, respectively. One of the anisotropically curved surface R1 described above is a toric or cylindrical surface, which produces an astigmatism of $-\delta m$ in such a direction that it compensates the astigmatism of $\delta m$ produced by the fact that the light beam passes through the beam splitter 3. The other anisotropically curved surface R2 is a toric or toroidal surface in order to produce an astigmatism $\delta c$ in an arbitrary direction (preferably 45° according to the principle) and at the same time to set the magnification of imaging on the surface of the photosensitive element 8 at a predetermined value. The anisotropically curved surfaces R1 and R2 may be exchanged with each other, front and rear.

Now the operation of the embodiment described above will be explained.

As indicated in FIG. 1, the cross-section of the light beam before the correcting lens 7 is denoted by A; the cross-section of the light beam at the middle point between the front and rear anisotropically curved surfaces R1 and R2 by B, and the cross-section of the light beam behind the anisotropically curved surface R2 by C.

Figure 3A:
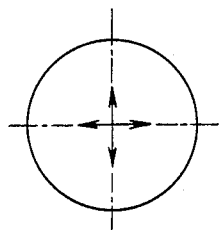
FIGS. 3(A), 3(B) and 3(C) are cross-sectional views showing conceptionally the state of the light beam before, at and behind the correcting lens used in the embodiment stated above, respectively.

Since the beam splitter 3 is a parallel plane plate disposed obliquely, an astigmatism of $\delta m$ is produced in the focused light beam, which has passed through the beam splitter 3. The direction of the production of this astigmatism is determined unequivocally, depending on the direction of the inclination of the beam splitter 3. For example, it is produced in the direction as indicated in FIG. 3(A). Here, in order to eliminate off-set errors due to the displacement of the light spot, when the objective lens 5 is moved in the tracking direction, the direction of the astigmatism of $\delta m$ is inclined by about 45° with respect to the objective lens drive direction for the tracking.

Figure 3B:
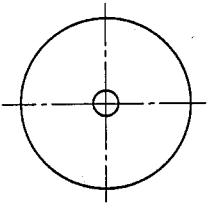
Figure 3C:
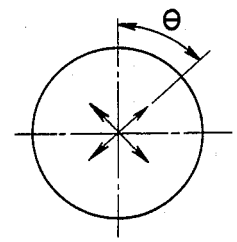

The surface R1 of the correcting lens 7 is a toric or cylindrical surface having such an anisotropic curvature that an astigmatism in the reverse direction is produced in order to compensate the astigmatism of $\delta m$ and thus the light beam, which has passed therethrough, is spherically focused wave including no astigmatism, as indicated in FIG. 3(B).

On the other hand, the surface R2 of the correcting lens 7 is a toric or toroidal surface having an axis of anisotropy in an arbitrary direction $\theta$, which produces a new astigmatism, depending on the magnitude of the anisotropy in the curvature of the surface R2 stated above. The magnitude of this astigmatism is determined so as to be necessary and sufficient for detecting focusing errors of the pickup. The surface R2 stated above acts as a magnifying lens, depending on the average curvature thereof and the magnification of imaging on the surface of the photosensitive element 8 is set to have a predetermined value desirable for mounting and adjusting the pickup. Most of magnifications of general pickups for compact disk is 10 to 20, based on the spot size on the light receiving surface, etc. The direction of the new astigmatism is inclined by about 45° with respect to the objective lens drive direction for the tracking. In this way, it is possible to prevent off-set errors in the focusing error detection signal.

In the embodiment indicated in the figures, the optical axis S—S of the correcting leans is inclined by $\Phi$ with respect to the optical axis X—X. This is for the purpose of eliminating influences of coma produced by the beam splitter 3 and in the case where the influences of coma on the characteristics cannot be neglected, it may be used in this way.

According to the embodiment described above, since the function to compensate the astigmatism produced by the beam splitter and the function to set the magnification of imaging on the surface of the photosensitive element at a predetermined value by producing a new astigmatism in an arbitrary direction are unified on a single lens, this invention has a number of advantages as follows.

(1) Since the magnitude and the direction of the astigmatism can be selected arbitrarily by using anisotropically curved surfaces, which are toric and/or toroidal, the design freedom is remarkably increased and it is possible to obtain an optimum optical system.

(2) Since the beam splitter and the optical axis connecting the photosensitive element therewith can be freely selected, the design freedom for the shape of the optical head is high and it is possible to construct a simple optical system.

(3) Since the number of optical elements can be reduced, it is easy to maintain the precision, and operability for the adjustment is also high.

(4) Since it is possible to eliminate easily the astigmatism produced by the beam splitter by means of the correcting lens, it is possible to select arbitrarily material, thickness, etc. of the mirror without having any influences on the focusing error detection characteristics.

Further it is possible that both of the two surfaces R1 and R2 of the correcting lens are toric. In this case, the curvature obtained by synthesizing the average curvatures of the two surfaces may be considered as a factor determining the magnification of imaging of one magnifying lens.

The two surfaces R1 and R2 of the correcting lens may be exchanged with each other, front and rear. In this case, it is a matter of course that the optimum curvature is varied more or less because of the fact that the positions of the two surfaces in the optical axis direction are exchanged with each other, front and rear.

A polarizing mirror or a prism may be used as the beam splitter (isolator) and a half mirror or a half prism of non-polarizing type may be used instead thereof.

According to this invention, since the function to compensate the astigmatism produced by the beam splitter and the function to set the magnification of imaging on the surface of the photosensitive element at a predetermined value by producing a new astigmatism in an arbitrary direction are unified on a single lens, the magnitude and the direction of the astigmatism can be selected arbitrarily by using anisotropically curved surfaces; the design freedom is remarkably increased; and it is possible to obtain an optimum optical system. Further, since the beam splitter and the optical axis connecting the photosensitive element therewith can be freely selected, the design freedom for the shape of the optical head is high and it is possible to construct a simple optical system. Furthermore, since the number of optical elements can be reduced, it is easy to maintain the precision and operability for the adjustment is also high.

What is claimed is:

1. An optical pickup, comprising:
   a parallel plane plate type beam splitter disposed between an object to be scanned and a photosensitive element;
   optical means for projecting a light beam from a light source to said beam splitter and then to said object, which reflects said light beam, and for guiding said light beam reflected by said object through said beam splitter to said photosensitive element, said beam splitter imparting astigmatism to said light beam as said light beam passes therethrough; and
   a correcting lens which has first and second anisotropically curved surfaces and which is disposed between said parallel plane plate type beam splitter and said photosensitive element, wherein said first anisotropically curved surface is on the parallel plane plate type beam splitter side of said correcting lens and is one of a toric and a cylindrical surface producing astigmatism in said light beam which substantially compensates for said astigmatism produced by said parallel plane plate type beam splitter, and wherein said second anisotropically curved surface is on the photosensitive element side of said correcting lens and is one of a toric and a toroidal surface producing astigmatism in a predetermined direction and at the same time setting the magnification of imaging on the surface of said photosensitive element at a predetermined value.

2. An optical pickup according to claim 1, wherein the direction of the astigmatism produced by said second anisotropically curved surface on the photosensitive element side of said correcting lens is inclined by about 45° with respect to the direction of the astigmatism produced by said first anisotropically curved surface on the parallel plane plate type beam splitter side of said correcting lens.

3. An optical pickup according to claim 1, including a totally reflecting mirror located between said object to be scanned and said photosensitive element, wherein an optical axis extending from said totally reflecting mirror to said parallel plane plate type beam splitter and said photosensitive element forms a right angle with respect to an optical axis extending from said totally reflecting mirror to said object to be scanned.

4. An optical pickup according to claim 3, further including an objective lens located between said totally reflecting mirror and said object to be scanned.

5. An optical pickup according to claim 1, wherein said correcting lens has an optical axis which is inclined with respect to an optical axis along which said light beam travels from said beam splitter to said correcting lens.

6. An optical pickup according to claim 1, wherein said correcting lens includes a tubular portion and includes a lens portion extending transversely across the interior of said tubular portion at a location between the axial ends of said tubular portion, said first and second anisotropically curved surfaces being provided on opposite axial sides of said lens portion.

7. An optical pickup according to claim 6, wherein said correcting lens is made of a glass material.

8. An optical pickup according to claim 6, wherein said correcting lens is made of a plastic material.

9. An optical pickup according to claim 1, wherein said optical means includes a diffraction grating provided between said light source and said beam splitter.

* * * * *